US006628110B2

(12) United States Patent
Zafarana et al.

(10) Patent No.: US 6,628,110 B2
(45) Date of Patent: Sep. 30, 2003

(54) VOLTAGE/CURRENT CONTROLLER DEVICE, PARTICULARLY FOR INTERLEAVING SWITCHING REGULATORS

(75) Inventors: Alessandro Zafarana, Milan (IT); Claudia Castelli, Brugherio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 25 days.

(21) Appl. No.: 10/197,237

(22) Filed: Jul. 15, 2002

(65) Prior Publication Data

US 2003/0034766 A1 Feb. 20, 2003

Related U.S. Application Data

(63) Continuation-in-part of application No. 09/955,735, filed on Sep. 18, 2001.

(30) Foreign Application Priority Data

Oct. 19, 2000 (IT) ..................................... MI2000A2042

(51) Int. Cl.[7] .................................................. G05F 1/40
(52) U.S. Cl. ..................................... 323/284; 323/282
(58) Field of Search ................................ 323/265, 268, 323/270, 271, 275, 276, 277, 280, 282, 284, 285

(56) References Cited

U.S. PATENT DOCUMENTS

| 5,973,936 A | * | 10/1999 | Lenz et al. | .................... 363/15 |
| 6,396,311 B2 | * | 5/2002 | Inn | .............................. 327/70 |
| 6,465,994 B1 | * | 10/2002 | Xi | ............................... 323/274 |
| 6,492,845 B1 | * | 12/2002 | Ge et al. | ....................... 327/53 |

* cited by examiner

Primary Examiner—Matthew Nguyen
(74) Attorney, Agent, or Firm—Lisa K. Jorgenson; Robert Iannucci; Seed IP Law Group PLLC

(57) ABSTRACT

A voltage/current controller device, particularly for interleaving switching regulators, comprises: a DC/DC converter having a plurality of modules, with each module including a drive transistor pair connected in series between first and second supply voltage references, a current sensor connected to one transistor in the pair, and a current read circuit connected to the sensor. Advantageously, the read circuit comprises a transconductance amplifier connected across the current sensor to sense a voltage signal related to a load current being applied to each module, the transconductance amplifier reading the voltage signal with the transistor in the conducting state.

19 Claims, 9 Drawing Sheets

VOLTAGE/CURRENT CONTROLLER DEVICE, PARTICULARLY FOR INTERLEAVING SWITCHING REGULATORS

CROSS-REFERENCE TO RELATED APPLICATION

This application is a continuation-in-part of U.S. patent application Ser. No. 09/955,735, filed Sep. 18, 2001, now pending, which application is incorporated herein by reference in its entirety.

BACKGROUND OF THE INVENTION

1. Field of the Invention

The present invention relates to a voltage/current controller device, particularly for interleaving switching regulators.

Specifically, the invention relates to a controller device as above, which comprises a DC/DC converter having a plurality of modules, each module including a pair of drive transistors connected in series between first and second supply voltage references, a current sensor connected to one transistor in said pair, and a current reading circuit connected to said sensor.

The invention relates, particularly but not exclusively, to a controller device for switching regulators of the interleaving type as used in computer processors, this description making reference to this field of application for convenience of illustration only.

2. Description of the Related Art

As is well known, developments in the electrical characteristics of computer processors, e.g, PC, WORKSTATION, and SERVER, are compelling the manufacturers to seek new solutions in order to meet the requirements of central processing units (CPUs).

In particular, CPUs require an accurately adjusted supply voltage (±0.8% at steady state, ±3% in transient conditions).

However, supply voltages as low as 1.1 V, and load currents of up to 100 A, with 100 A/µs edges, are used at present. This requires a higher efficiency than 80%.

So it is that current or voltage control devices must be employed, which can assure of the necessary efficiency. To fill the above demands, a low-cost device of this kind may comprise an interleaving type of DC/DC converter, for example.

In particular, this converter layout is obtained by connecting in parallel N DC/DC converters in a step-down configuration, i.e., with the voltage input and output connected together. Each DC/DC converter is referred to as the "module" or "channel".

An interleave configuration needs a synchronization circuit to close the high-side switches of the converter modules with a phase shift equal to the switching period divided by the number N of modules.

For simplicity, reference will be made hereinafter to a DC/DC converter having two interleaving modules.

It should be noted that when a conventional voltage mode control is applied to an interleaving type of converter an uncontrolled distribution of the currents flowing through the inductors of the parallel modules is produced. Thus, to perform satisfactorily, the converter requires that the total load current be split equally among the modules, i.e., that each module carried a current equal to the target output current divided by N. This control technique is known as "current sharing".

Additionally to said current-sharing option, interleaving DC/DC converters are required to vary the output voltage level proportionally to the target output current. In other words, with Vout,nom being the rated output voltage, i.e., the voltage value when the converter is outputting no current, and Iout being the value of the output current, the output voltage level Vout is given as:

$$Vout = Vout,nom - Iout * K,$$

where K is a factor decided upon outside the converter.

This option is known as "voltage positioning" or "droop function".

Conventional converter devices with current-sharing and droop function options are available commercially in several different types.

These devices must also check that the current load, if anomalous, does not damage the equipment which is power supplied by the dc—dc converter. Over-current, or even short-circuit, conditions are load degeneration conditions which must be detected and solved by the control system in order to protect itself and the load. As it is evident, the voltage positioning and current sharing systems, as well as protection systems against over-current and short-circuit conditions require an efficient reading and processing system of the analog information "current of each phase".

Such options involve the need for a converter operative to read or estimate the output current from each module. In particular, the DC/DC converter is to include a read circuit arranged to read this module current by the voltage drop across an output resistor. This resistor may be parasitic to the circuit, e.g., the power switch resistance Rds,on or the DCR of an inductor, or be an element deliberately introduced in the read circuit and usually designated Rsense.

Using a dedicated resistive element Rsense is advantageous in that the reading obtained is highly accurate and unaffected by temperature (e.g., using resistors made of constantan). It has, however, the disadvantages of being expensive and providing a less efficient current-to-voltage conversion within the converter.

On the other hand, utilizing a parasitic element inside the read circuit is surely more cost-efficient, since existing elements in the read circuit can be used. However, this solution lowers reading accuracy because it responds to both manufacturing variations and operating temperatures.

Illustrated schematically by FIGS. 1 to 4 are different conditions in the operation of an interleaving DC/DC converter according to the prior art.

Assume for simplicity the target output current Iout to have been split equally among the N converter modules.

FIG. 1 shows schematically an interleaving DC/DC converter 1 that comprises at least one module 2, in turn comprising a high-side transistor $M_{HS}$ and a low-side transistor $M_{LS}$ connected in series together between a first or supply voltage reference VDD and a second or ground voltage reference GND. The module 2 is connected to a load comprising a network 3, in turn connected between a terminal X intermediate the transistors $M_{HS}$, $M_{LS}$ and ground GND.

This network 3 comprises a series of an inductor L and a capacitor C.

Illustrated schematically in FIG. 1 is a working condition in which the reading performed is a current reading effected across the drain and source terminals of the high-side transistor $M_{HS}$.

In this case, the reading is little dissipative. Being Iout,2 the average current from any module 2, i.e., the average current through the inductor L in the network 3, the power dissipated through the DC/DC converter 1 having N modules will be:

$$D*N*Rds,on*(Iout,2)^2$$

where D is the ratio of the output voltage value Vout to the value of the supply voltage VDD of the DC/DC converter 1 (D=Vout/Vin). The ratio D is, therefore, quite small, in particular between 1V/12V and 1.85V/12V.

In conventional converters, the high-side transistor $M_{HS}$ will close for a time duration D*Ts (where Ts is the switching period of the converter 1). This duration is very small, however.

Also, when the high-side transistor $M_{HS}$ closes and its source terminal reaches a value equal to an input voltage Vin, the reading becomes injured by noise from capacitive coupling effects.

All this makes for difficult reading.

FIG. 2 likewise shows a working condition in which a current reading is performed across the drain and source terminals of the low-side transistor $M_{LS}$.

In this case, the reading is little dissipative, and the power dissipated is:

$$N*Rds,on*(1-D)*[Iout,2]^2.$$

The low-side transistor $M_{LS}$ will close for a time duration (1-D)*Ts. This time allows a reading to be completed even with conventional converters. For example, a resistive element Rsense in series with the low-side transistor $M_{LS}$ may be used.

FIG. 3 shows schematically a working condition in which a current reading is performed across the inductor L of the network 3.

In this case, the reading is dissipative, the power dissipated being:

$$N*DCR*Iout,2^2$$

where DCR is the equivalent resistance of the inductor L in the network 3.

It should be noted, however, that the intermediate node X, being connected to one end of the inductor, would exhibit voltage values within the range of ground reference GND to input voltage Vin. Thus, the reading must be made by filtering the voltage signal at the node X to extract continuous information. This filtering introduces new components, and injures the overall speed of the DC/DC converter 1.

To obviate this, it has been known to use a dedicated resistive element Rsense (not shown) in series with the inductor L Likewise in FIG. 4, a working condition in which an input current reading to the DC/DC converter 1 is performed.

In particular, an input terminal IN of the DC/DC converter 1 is connected to an input node XIN through a dedicated resistive element Rsense, with the node XIN being connected to first and second modules, 2a and 2b. These modules 2a, 2b have corresponding high-side transistors $M_{HS}$, corresponding low-side transistors $M_{LS}$, and respective networks formed, for simplicity, of a single capacitor C and respective inductors La and Lb.

In this case, the reading is little dissipative. Being Iout,i the average current from the generic i-th module, the power dissipated will be:

$$Rsense*D*N*(Iout,i)^2.$$

The differential signal across the dedicated resistive element Rsense will always be a low voltage value, but the measuring time will be quite short (equal D*Ts) and compel use of the dedicated resistive element Rsense.

The above discussion of different working conditions clearly shows that a controller with current sharing and droop function options, i.e., adapted for use in an interleaving regulator, can only be obtained when a current reading is performed across the drain and source of the low-side transistor $M_{LS}$, such as shown in FIG. 2 for example.

BRIEF SUMMARY OF THE INVENTION

An embodiment of this invention provides a voltage/current controller device with appropriate structural and functional features for efficient reading, specifically low-dissipation reading, and that overcomes the limitations of prior devices.

An embodiment of this invention uses a read circuit that can correctly read, with low dissipation, a signal appearing at a suitable sensor and being related to the load on the controller device.

An embodiment of this invention provides a controller device comprising: a DC/DC converter having a plurality of modules, with each module including a drive transistor pair connected in series between first and second supply voltage references, a current sensor connected to one transistor in said pair, and a current reading circuit connected to said sensor. The read circuit comprises a transconductance amplifier connected across the current sensor to sense a voltage signal related to a load current being applied to each module, said transconductance amplifier reading said voltage signal with said transistor in the conducting state.

The features and advantages of a controller device according to the invention will be apparent from the following description of an embodiment thereof, given by way of non-limitative example with reference to the accompanying drawings.

DETAILED DESCRIPTION OF THE INVENTION

Figure 1:
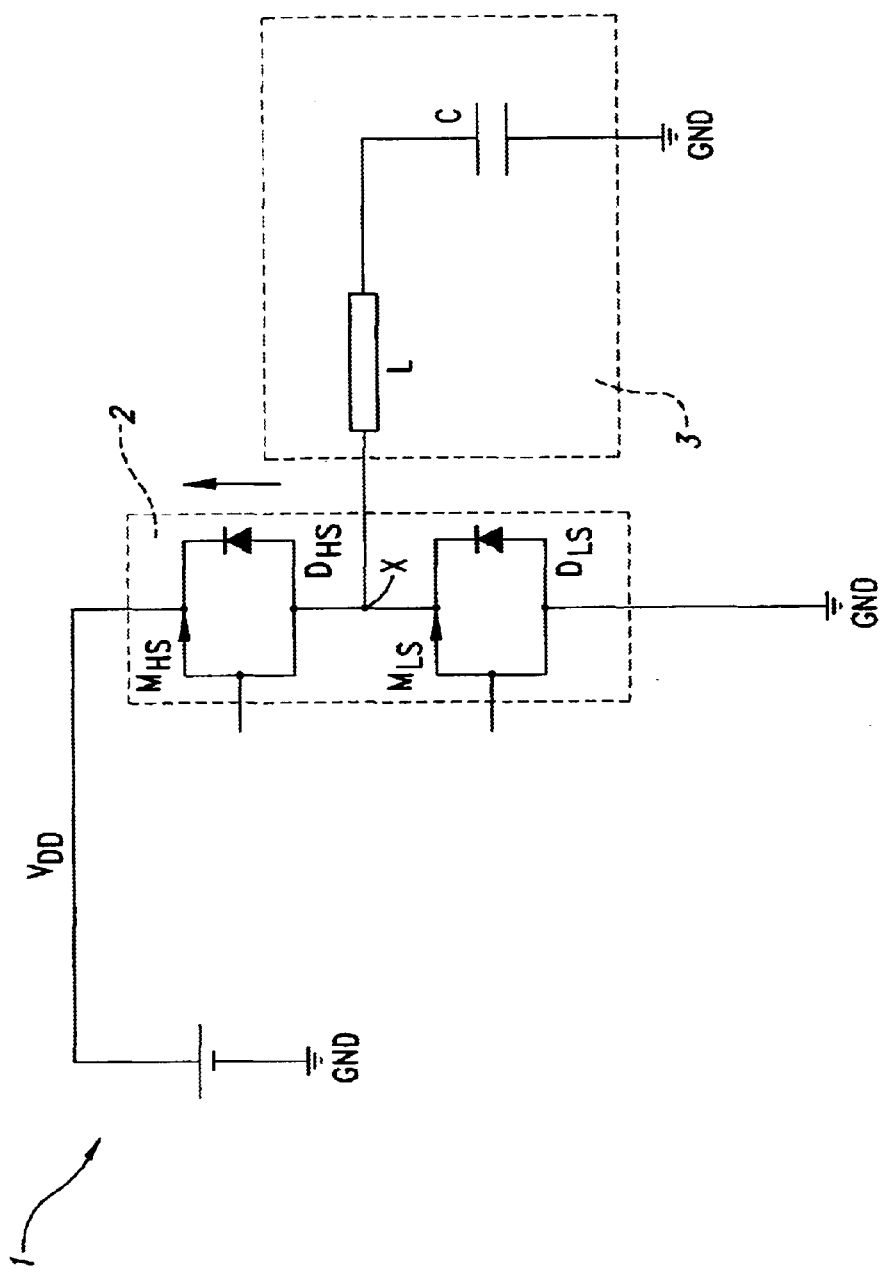
FIGS. 1 to 4 illustrate schematically respective working conditions of voltage controller devices that incorporate interleaving switching DC/DC converters according to the prior art.
Figure 2:
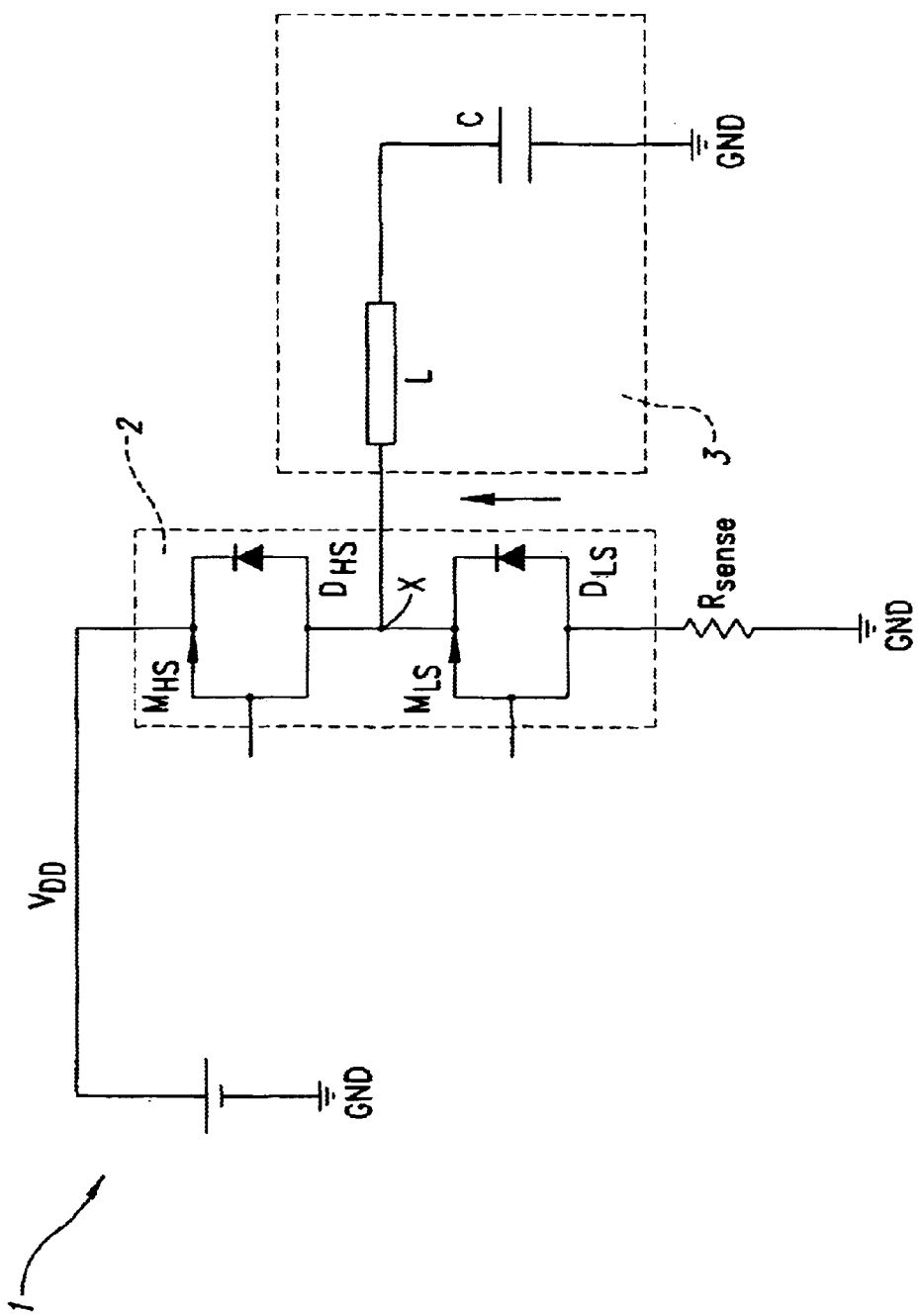
Figure 3:
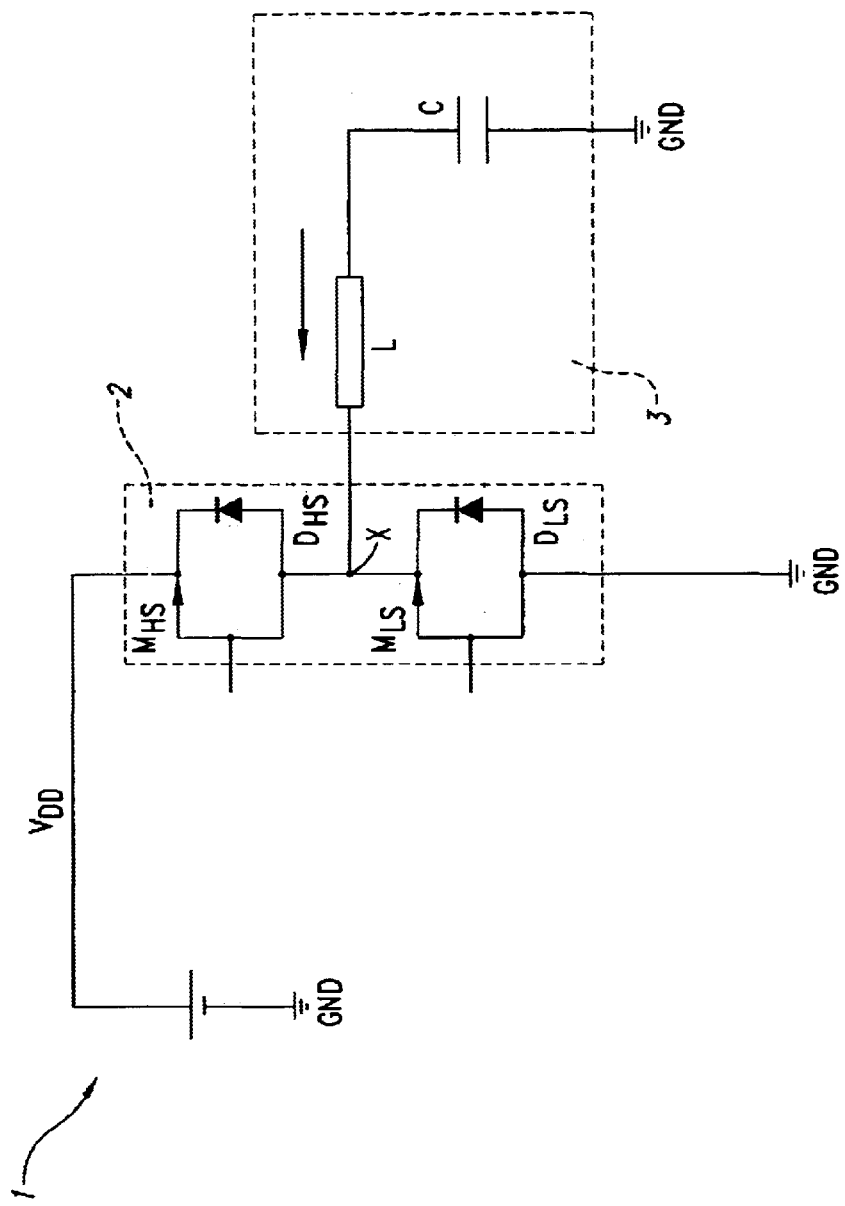
Figure 4:
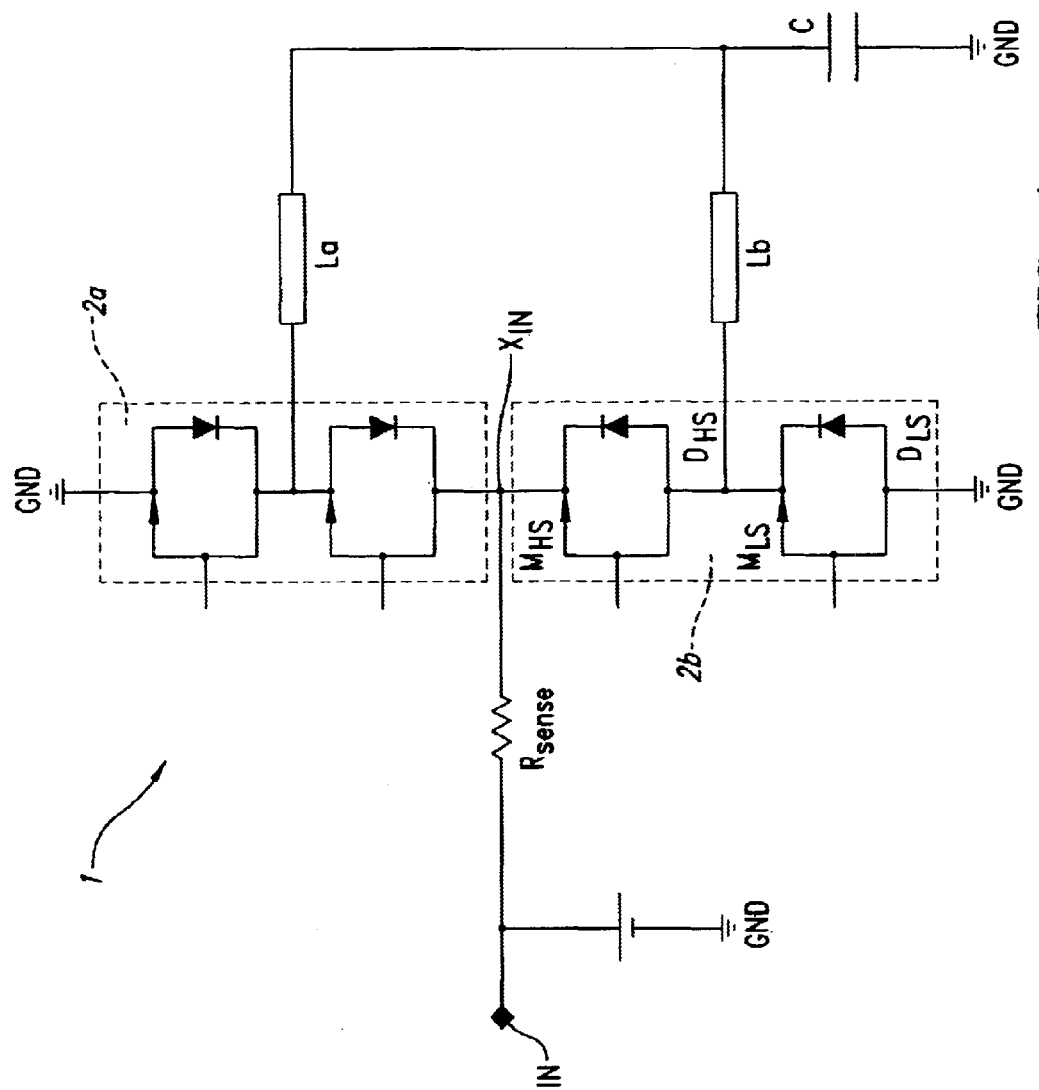
Figure 5:
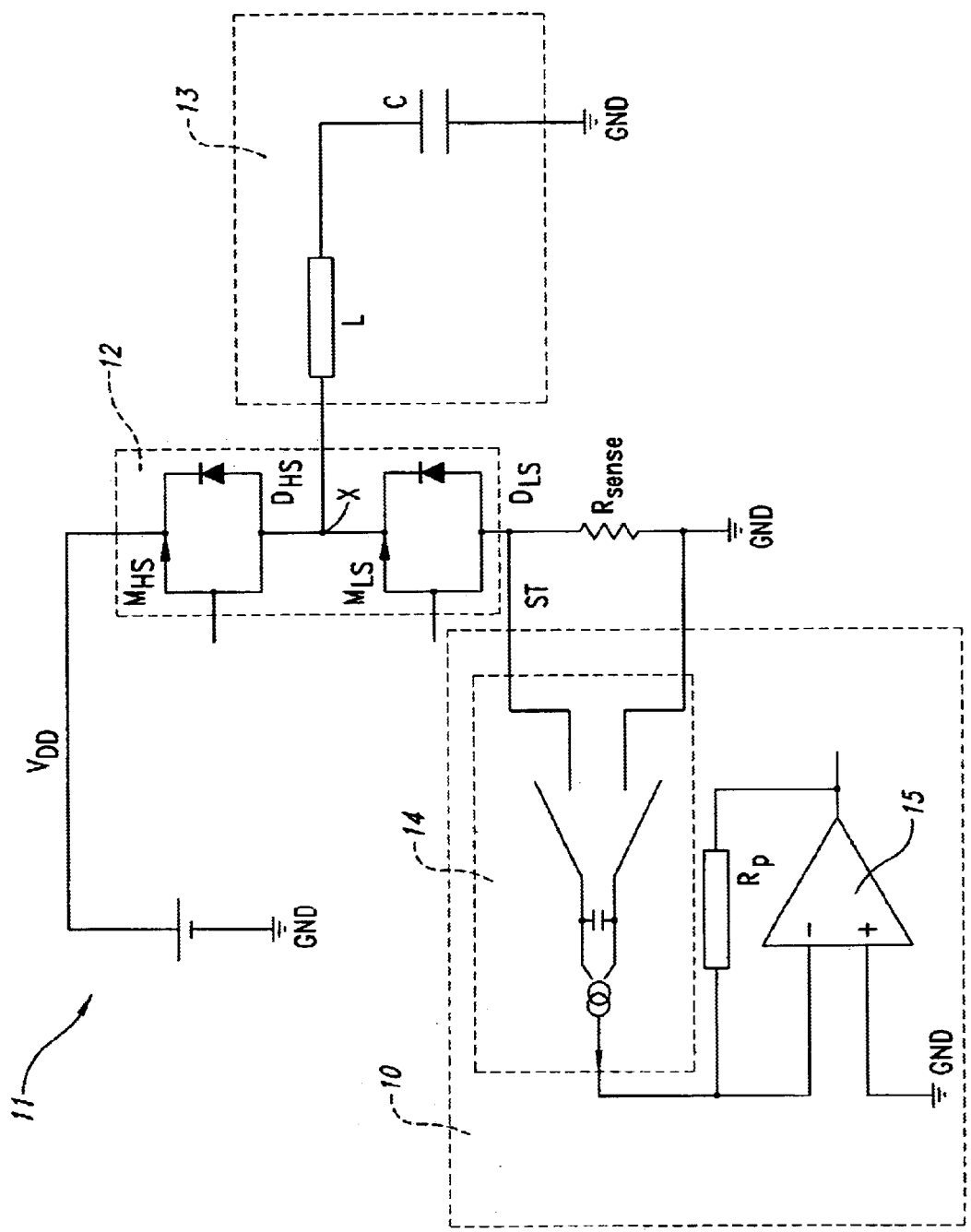
FIG. 5 shows schematically a controller device according to the invention.

With reference to the drawings, shown schematically in FIG. 5 is a voltage/current controller device according to this invention. This controller device comprises essentially an interleave type of DC/DC converter 11 that includes a plurality of modules 12 and a read circuit 10.

Only one module 12 will be described for simplicity. The module 12 comprises a transistor pair connected between a first voltage reference being a supply voltage VDD and a second voltage reference being a ground voltage GND.

The module 12 comprises a high-side transistor $M_{HS}$ and a low-side transistor $M_{LS}$, which transistors are connected in series with each other to said first or supply voltage reference VDD. An intermediate circuit node X, interconnecting said transistors, is connected to ground GND through an LC network 13 comprising a series of an inductor L and a capacitor C.

Diodes $D_{LS}$ and $D_{HS}$ are connected between the conduction terminals of the transistors $M_{LS}$ and $M_{HS}$. In practice, these diodes $D_{LS}$ and $D_{HS}$ may be the intrinsic diodes of the MOS transistors $M_{LS}$ and $M_{HS}$.

A current sensor, such as a read resistor Rsense having the read circuit 10 connected across it, is connected serially to the low-side transistor $M_{LS}$.

It should be noted that the read circuit 10 could be connected across the low-side transistor $M_{LS}$ directly. In this case, the current sensor Rsense would be the equivalent resistor Rds,on of the low-side transistor $M_{LS}$.

Thus, the reading performed will be theoretically non-dissipative, and cost nothing. In practice, however, account should be taken of variations in the fabrication process of the low-side transistor $M_{LS}$ being apt to introduce minor amounts of dissipation.

Advantageously, the read circuit 10 comprises a track-and-hold transconductance amplifier 14 connected across the current sensor, i.e., the read resistor Rsense. The amplifier 14 is further connected to an inverting (−) input terminal of an error amplifier 15, which error amplifier has a non-inverting (+) input terminal connected to ground GND, and has an output terminal feedback-connected to the inverting input terminal through a bias resistor Rp.

The read circuit 10 allows a voltage signal ST to be sensed across the read resistor Rsense. This voltage signal ST is the voltage between the drain and source terminals of the low-side transistor $M_{LS}$. The use of the read circuit 10 in the other working conditions previously described in relation to the state of the art is readily inferable.

Information about the load current applied to the module 12 is obtained from the voltage signal ST as picked up at the drain and source terminals of the low-side transistor $M_{LS}$. Therefore, the voltage signal ST can only be read with the transistor $M_{LS}$ in a conductive state.

However, proper operation of the read circuit 10 requires that the reading of the voltage signal ST be interrupted while:

the high-side transistor $M_{HS}$ is conducting; and
the diodes $D_{LS}$ and $D_{HS}$, corresponding to intrinsic diodes for synchronous MOS transistors, are conducting.

For minimum noise, it is also advisable to discontinue reading during the on/off switching of the low-side transistor $M_{LS}$.

This reading control is advantageously implemented in this invention by the read circuit 10 including a track-and-hold transconductance amplifier 14.

Figure 6:
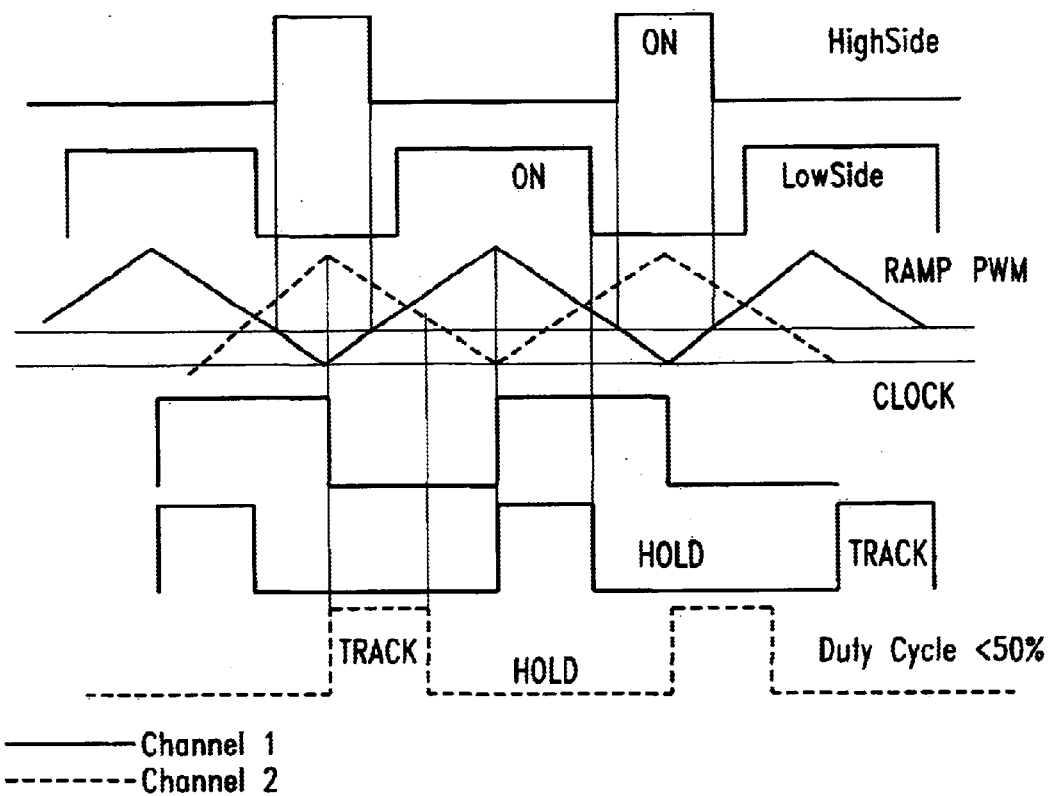
FIGS. 6 and 7 show schematically plots against time of internal signals of the controller device of FIG. 5.

To minimize noise from the MOS transistor switching, the track and hold phases of the transconductance amplifier 14 should be carefully selected, as shown schematically in FIG. 6.

In particular, the track or updating signal is generated by combining the control signal to the low-side transistor $M_{LS}$ and a clock signal to the channel of module 12. These control and clock signals may be combined in a logic operator such as an AND gate.

Thus, the updating will occur long after the low-side transistor $M_{LS}$ is turned on, and the noise involved will not affect reading.

The low-side transistor $M_{LS}$ is turned off after the off command (LowSide=0), and while the reading is in the ensuing hold phase. Thus, not even the switching off of the low-side transistor $M_{LS}$ will affect reading.

A triangular signal PWM is obtained at the output of the error amplifier 15.

It should be considered that there are at least two interleaved channels per DC/DC converter 11, their phase shift being Ts/2, as shown by the dash-and-dot curves in FIG. 6. For example in CPU applications, the read circuit 10 always has a duty cycle of less than 50%, even during transients when the supply is 12 V.

Furthermore, the track-and-hold transconductance amplifier 14 provided effectively averts noise from the second channel switching as the first channel is being read.

The operation of the read circuit 10 will now be described.

With the low-side transistor $M_{LS}$ 'on', the read circuit 10 supplies a value equaling that stored at the end of the previous switching period (hold phase).

The information is updated from time Ts/2 to time Ts (track phase). The reading is updated at each switching cycle by the provision of a top limit in the duty cycle.

Figure 7:
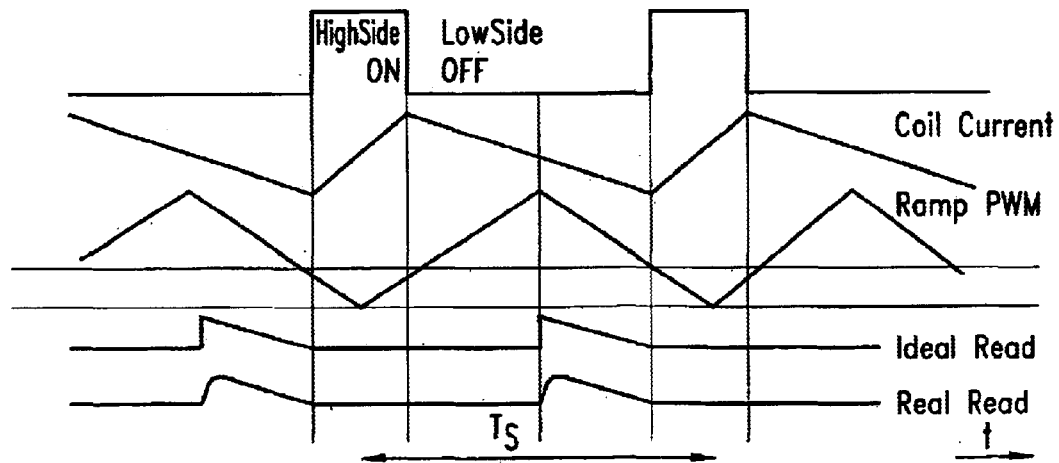

The read circuit 10 is also fast enough to track the shape of the current signal being passed through the low-side transistor $M_{LS}$, as shown in FIG. 7. This allows the signal to exhibit a peak that is half the current ripple in the inductors L of the modules 12 of the converter 11. Accordingly, this signal will require no further filtering stages, which filtering stages invariably offset the loop transfer function of the converter 11, complicating the study of the system overall stability.

The read circuit 10 curtails, therefore, the number of external components required by its respective DC/DC converter 11. The absence of filters, moreover, makes for fast current sharing even during transients.

At each switching cycle, read updating is assured by the introduction of a limitation to the maximum duty cycle that the DC/DC converter 11 is allowed.

Finally, the MOS transistor switching noise is minimized by suitably selecting the track and hold phases for the transconductance amplifier 14.

The read circuit 10 can serve several functions of its respective DC/DC converter 11, making the latter suitable for the applications specified in connection with the state of the art.

The DC—DC converter 11 also allows the current flowing through each coil to be limited. Since the coils available on the market have electrical characteristics depending on the current flowing therethrough, it is necessary to limit both the average current and the highest peak of the current flowing in the coils when the output load undergoes anomalous conditions.

When these situations occur, the power dissipated by the individual components making up each phase of the interleaved dc—dc converter can overcome the highest design level and leads therefore to breaking of or damage to the components.

The control system must, however, allow the load temporary operation in "Overload" conditions discriminating between situations in which, for example, the CPU works at its maximum and anomalous situations in which the CPU presents excessive load conditions on account of its degrade. The "Overload" situation should therefore be a temporary situation that does not necessarily cause the controller to take drastic decisions like the "Fault" condition (in which the controller indefinitely stops regulating and supplying the load), while the anomalous load condition or "Short Circuit"

should bring the system to the Fault condition to protect the components therein.

The problem does not have an easy solution for those controllers that use the extracted current as a voltage drop across the low-side transistor $M_{LS}$. When anomalous load conditions occur (of the "overload" or "short circuit" types), the controller responds in two phase: initially it increases the duty cycle of all of the phases to respond to the new current requested by the load, and then (after 2–3 periods of the controller's internal clock), starts to vary by a few percentage points the duty cycles of each phase to try to balance the currents of the phases. During the first phase, the duty cycle is increased, but internally is limited to 85% to assure cycle by cycle the reading of the current through the turn on, although short by only 15%, of the low-side transistor $M_{LS}$. Although limited, the duty cycle causes a rapid increase in the current of the coils that the control system can't control because it reads the currents only when the low-side transistors are turned on.

A numerical example according to the conventional design techniques of these systems is now described with reference to FIG. 5:

VDD=12V, L=1uH, Vout=voltage across capacitor C=1.6V,

Fs=switching frequency=300 KHz, Dmax=0.85

Ton=Dmax/Fa=time wherein the high-side transistor is on

The peak current Ip across the coil L is thus:

Ip=Ton(Vcc−Vout)/L=29 4 A

The difficulty to control the current and to discriminate between overload and short circuit conditions is evident.

The new control technique generates a system that turns the dc—dc converter regulator from a voltage generator to a current generator. An excessive current variation is indicated by the current, read during start up of the low-side transistor $M_{LS}$, overcoming a certain threshold. In this case, the low-side transistor $M_{LS}$ is kept on, thereby decreasing the current level until the current reaches the above-mentioned threshold Ith. The high-side transistor $M_{HS}$ will be turned on at the next clock rise front.

In this condition, the Ton and Toff are thereby fixed since the duty cycle controlled by the voltage regulation control system would be higher than Dmax. Instead of the duty cycle being limited to Dmax (and thus to Ton,max) the voltage control system is overcome by the mechanism turning the voltage regulator into a current regulator.

The average current allowed to be supplied by the controller in this step is:

$$Icc=N\times(Ip/2+Ith)$$

where N is the number of phases.

The maximum current Imaxn flowing in each coil is:

$$Imaxn=Ith+Ip$$

The threshold Ith is thus programmable by means of resistors Rg fixing the reading circuit transconductance. In fact, if the current effectively flowing in the low-side transistor $M_{LS}$ is I1 and Rdson1 is the resistance of the low-side transistor $M_{LS}$, the voltage drop across the low-side transistor $M_{LS}$ (Rdson1×I1) is then converted by the reading circuit in a current inside the device which is equal to Idie1=25 uA+Rdson1×I1/Rg. Inside the device the current threshold Is amounts to 55 uA. The current comparator comparing Idie1 to Is will keep the low-side transistor $M_{LS}$ on until the step current reaches the level Ith=30 uA×Rg/Rdson1.

For example: if N=2, Vcc=12V, Vo=1.6V, L=1 uH, Fs=300 KHz, Iout_maxn=30A, Iout_max=60A Iout_maxn is the highest nominal load per phase, Iout_max is the total regulator lead; the operation in the constant current mode is a transitory anomalous situation of the overload type. At the nominal load, the regulator must operate normally. It is therefore necessary to design the Ith so that, at the load Iout_maxn, the regulator operates normally. The error of the current reading circuit and the precision of the value Rdson supplied by the Power Mos manufacturers lead Ith to be fixed at 120% of Iout_maxn.

Therefore, $$Icc(Dmax)=2\times[0.5\times Dmax(12V-1.6v)/(1\ uH\ 300\ KHz)+1.2\times30A]$$

$$Imaxn(Dmax)=Dmax(12V-1.6V)/(1\ uH\ 300\ KHz)+1.2\times30A$$

If Dmax corresponds to 85%, considerably high values will be obtained (Icc=101A and Imaxn=65A). Such high values compel the use of expensive coils (able to support 65A) and power components having a very high dissipation (for the lowside with Rdson=8 mΩ, P~8 mΩ×50.5A2= 20W). Instead, if Dmax is in turn a function of the current read and of Vin, it is possible to reduce Icc and Imaxn without limiting the duty cycle when the load current is small. In fact, if the duty cycle is limited even by little load current, the system would respond more slowly to sudden current variations. Such a relation has been chosen, being effective for a controller of two phases:

$$Dmax(Idie1+Idie2,Vin)=Dmax\_nom-Kl\times(Idie1+Idie2-50\ uA)-KV\times(Vin-Vin\_nom)$$

Where:

Dmax_nom=0.85(85% with zero load current and Vin equal to the nominal value thereof)

Kl, KV positive constants to be determined

Also:

$$Vin\_nom=12V\ and\ Vin=Vin\_nom+/-10\%$$

$$Idie1+Idie2-50\ uA=I1\times Rdson1/Rg+I2\times Rdson2/Rg=Rg=(I1+I2)\times Rdson/Rg=Iout\times Rdson/Rg$$

Where Iout is the required load current, I1 and I2 are the currents of each phase, Rdson1=Rdson2 for convenience.

Therefore:

$$Dmax(Iout,Vin)=Dmax\_nom-Ki\times Iout\times Rdson/Rg-KV\times(Vin-Vin\_nom)$$

Assuming that KV=0, Ki can be chosen so that Icc equals to 130% of Iout_max. Therefore, being Ith fixed at 120% of Iout_maxn, in the above numerical example, at the nominal Vin, Dmax equals 85% with zero load and 17% with load Iout=1.2×60A=72A. Choosing Ki=11000 S, Rdson=8 mΩ, Rg=9.6KΩ, Icc is equal to 78A, i.e. to 130% of Iout_max. Imaxn equals therefore to 48A.

Considering that the power dissipated by the low-side transistor $M_{LS}$ now is P~8 mΩ×39A$^2$=12W, i.e. almost reduced by a half with respect to the prior condition (20W), the cost savings of the application can thus be envisaged.

Overload

If the load is higher than Ith, the controller continues working, with Ton fixed at the value Dmax(Iout,Vin)/Fs and Toff forced by the application parameters (Vout and L). From a thermal point of view, the system must be sized to support and dissipate the power related to the current Icc. However it has already been seen that it is possible to have a sufficiently low current Icc (only 130% of the nominal load) due to the link between Dmax and Iout.

If the load requires a current which is higher than the nominal value, but lower than Icc, the dc—dc converter will not succeed in providing the current under stationary conditions. In fact, for high currents the value of the mosfet Rdson increases with the temperature (~15% between 25° C. and 100° C.), thus leading to a decrease in the protection levels Ith and Icc. This effect can be exploited to size an overload load lasting at most the thermal time constant of the Power Mos mounted on the application. Or it is possible to include this effect in the Icc definition allowing the system to work in an indefinite and stationary way under this condition. For that purpose, it is sufficient to set Ith at 135% of the nominal load and Icc at 145%.

Short Circuit

If the load overcomes Icc, the regulator output voltage drops since the dc—dc converter (turned to a current generator) cannot support the load. A comparator (UVS Under Voltage Protection) leads the system in the Fault condition if the output voltage drops below 40% of the nominal value thereof and the controller is in the constant current mode (i.e. the low-side transistor is on until the threshold Ith is reached).

Figure 8:
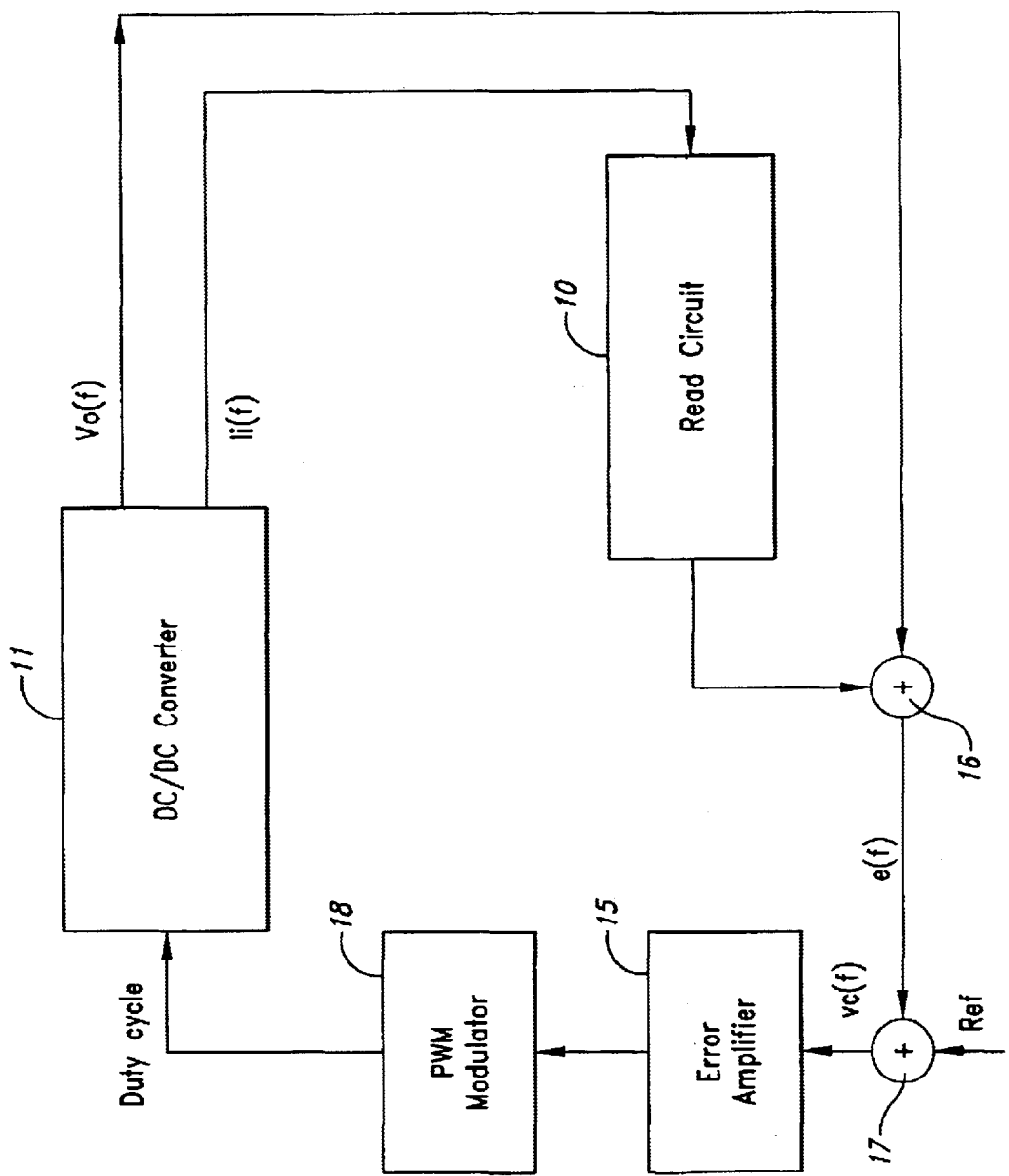
FIG. 8 shows schematically a modified embodiment of a controller device according to the invention.

Shown schematically in FIG. 8 is a modified embodiment of a controller device according to the invention, which again comprises a DC/DC converter 11, and adapted to implement the average current mode.

The output voltage from the DC/DC converter 11 is regulated to assure a fast response to load variations and adequate current sharing during transients.

In particular, each module 12 in the DC/DC converter 11, corresponding to one channel, has its output connected to a read circuit 10 and supplies the latter with a current signal li(f).

The read circuit 10 is further connected with its output to a summing node 16, the latter being also input the output voltage Vo(f) from each channel of the DC/DC converter 11. The result e(f) is a first-order estimate of the load current of the DC/DC converter 11, and is passed to an another summing node 17 that is input a reference signal Ref.

The output signal from this summing node 17 is input to the series of the error amplifier 15 and a PWM modulator 18 adapted to supply a duty cycle signal to the DC/DC converter 11.

The reading performed by the read circuit 10 is processed in the DC/DC converter 11 to obtain an error amplifier output voltage in the frequency domain given as:

$$vc(f)=Zf/Zi*vo(f)-Zf*k*\Sigma i\ Rsense*li(f)$$

where:
vs(f) is the control voltage of the PWM modulator 18,
vo(f) is the output voltage of each module or channel 12,
Zf is the output-to-inverting (−) terminal impedance of the error amplifier 15,
Zi is the inverting (−) terminal-to-output voltage impedance of the error amplifier 15, and
li(f) is the current sampling of the i-th module.

It should be noted that, in the frequency range of interest, i.e., between 0 and Fs/10 (where Fs is the switching frequency, i.e., the rate at which the DC/DC converter 11 switches over the modules 12), the value of the impedance Zf is sufficiently high to produce a major variation in the value vc and, hence, the duty cycle value. In addition, the signal li(f) has harmonic contents that is almost fully encompassed by the same interesting range.

In this way, the DC/DC converter 11 will use the current information from the read circuit 10 to determine the duty cycle, thereby functioning as a conventional current-mode controller.

The DC/DC converter 11 is provided stability by an additional compensation network (not shown) being connected between the output and inverting (−) terminals of the error amplifier 15. In general, a series of capacitor and a resistor will do.

Figure 9:
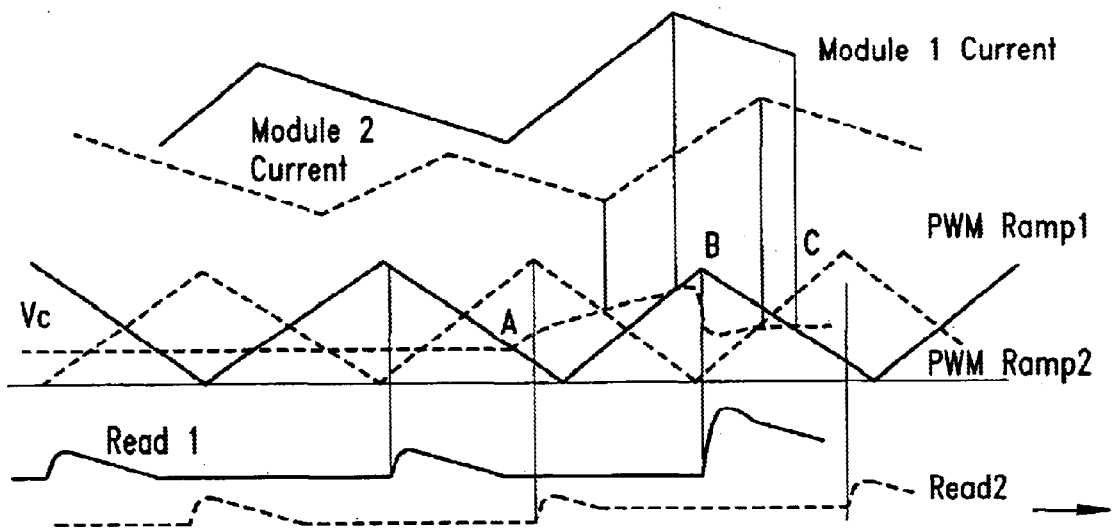
FIG. 9 shows schematically internal signals of the controller device of FIG. 8 plotted against time.

During transients, current sharing is achieved by the value Vc varying in consequence of the current of each module 12 and corresponding PWM ramp being read as shown in FIG. 9.

With reference to FIG. 9, assume two modules 12a and 12b to have different inductance values. During a load transient, the inductor currents will rise with different gradients, e.g., the current of module 12a may rise quicker than the current of module 12b.

Thus, the duty cycle, or just the same the control voltage Vc, will rise between a time A and a time B because of the error produced between the output voltage Vout and the reference voltage Ref. This is what is meant by the voltage mode. A measurement of current in the inductor is made between a time B and a time C. The greater the current variation the lower becomes the control voltage Vc, so that the time taken to turn off the low-side transistor $M_{LS}$ of the module 12a is lengthened.

However, too deep a filtering of the current readings would give a variation in the control voltage Vc that is only dependent on the error. In this case, the modules 12a, 12b would receive the same duty cycle, and it would be impossible to compensate for the current error between the modules 12a and 12b.

Figure 10:
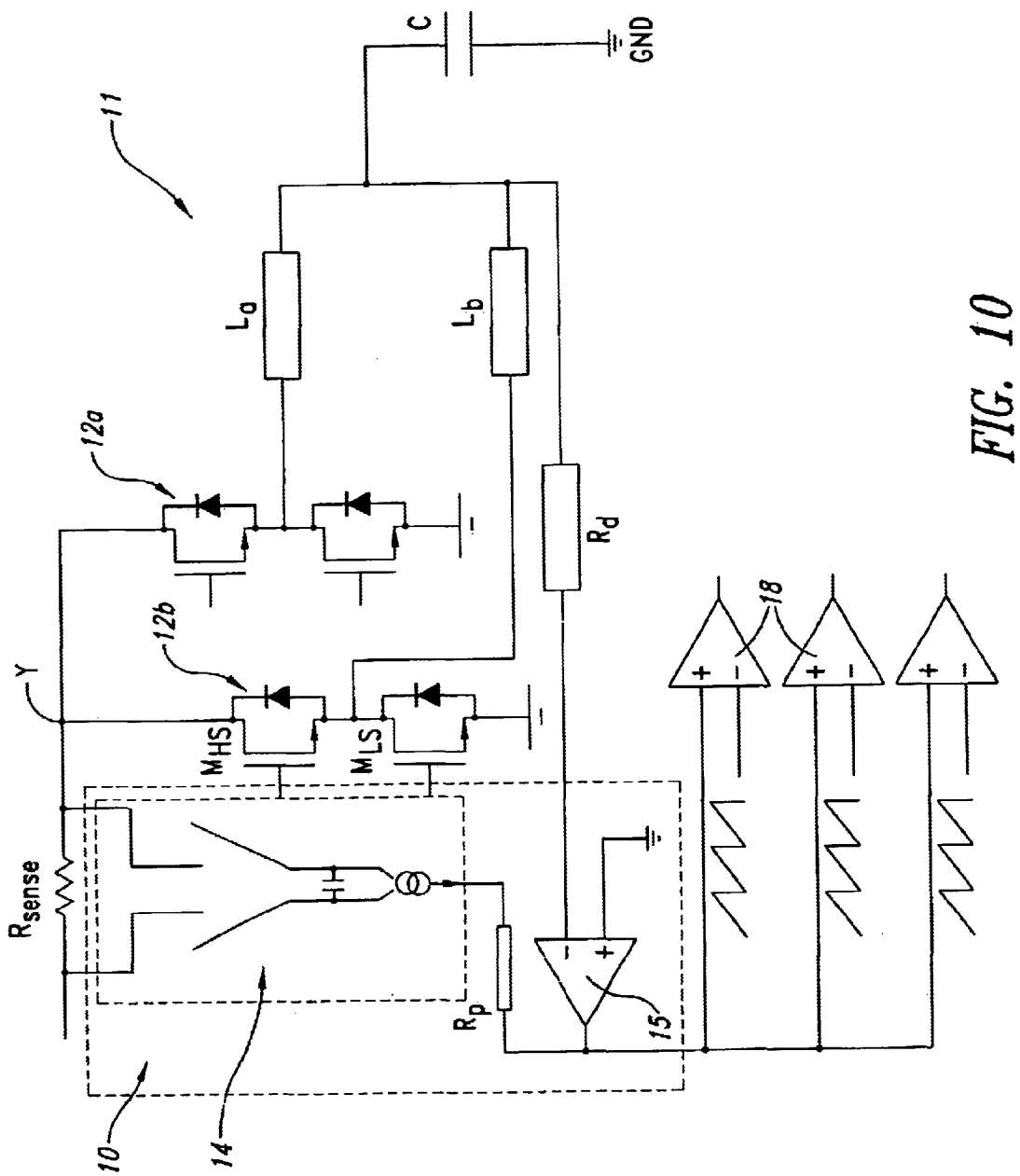
FIG. 10 shows schematically another modified embodiment of a controller device according to the invention.

FIG. 10 shows schematically another modification of the controller device according to the invention, which comprises a DC/DC converter 11 and a read circuit 10 for the signal across the drain and source terminals of the high-side transistors $M_{HS}$ of the modules of the DC/DC converter 11.

In particular, the DC/DC converter 11 comprises at least first and second modules, 12a and 12b, connected in parallel with each other between a circuit node Y and a ground GND, said modules having respective high- and low-side transistors, as well as respective inductors taken to ground through a common capacitor.

The interconnect node Y is connected to the supply reference VDD through a current sensor, e.g., a read resistor Rsense.

Advantageously, the read circuit 10 connected across the current sensor Rsense comprises a track-and-hold transconductance amplifier 14, and an error amplifier 15 having its output fed back to the inverting (−) input terminal through a bias resistor Rp.

The inverting (−) terminal is additionally connected to the first and second modules 12a and 12b through a decoupling resistor Rd.

Finally, the controller device comprises a plurality of PWM modulators 18.

Thus, the reading is performed on the input of the DC/DC converter 11 and updated (tracking phase) each time that the high-side transistor $M_{HS}$ of the modules 12a,b is turned on.

Figure 11:
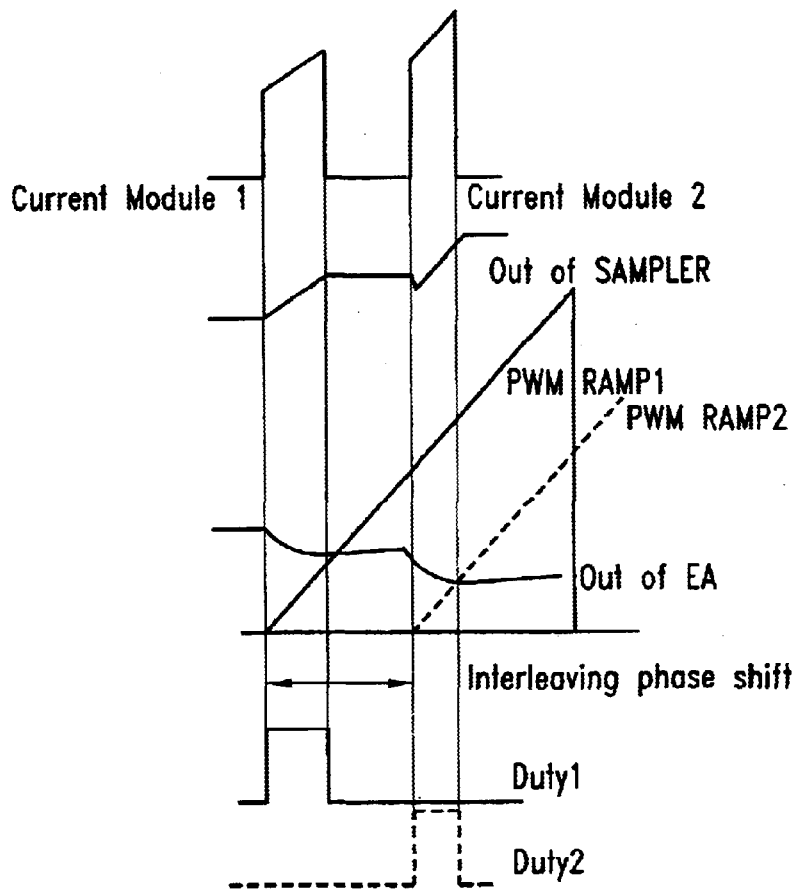
FIG. 11 shows schematically internal signals of the controller device of FIG. 10 plotted against time.

FIG. 11 shows signal waveforms of the DC/DC converter 11 picked up from an internal circuit node Y connected to one end of the current sensor Rsense as shown in FIG. 10. In particular a signal Out-of-Sampler is the current signal being injected into the error amplifier 15 through its inverting (−) terminal.

A signal Out-of-EA is the control voltage Vc, which voltage controls a reduction in the duty cycle (and hence, the module current) of the channel that is conducting the largest current.

The controller device of FIG. 10 has, moreover, the features listed here below.

Droop function: the information comprising the sum of the current readings (DC values) is used to shift the reference for the loop containing the error amplifier 15 proportionally to the load.

Average Current Sharing: the current information for each module is compared with the mean value of the currents to correct the loop control read voltage Vc of each channel. Thus, unbalance between channels can be corrected and the output currents equalized.

Current Limit: the unfiltered instant current information allows prompt and accurate troubleshooting. A comparator will be added to the DC/DC converter 11 in order to compare the reading and a reference with each other. In this case, the reading is constantly updated (by the provision of a top limit in the duty cycle) and the check on current can be made at each cycle.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A voltage/current controller device, comprising:
a DC/DC converter having a plurality of modules, with each module including a drive transistor pair of first and second drive transistors connected in series between first and second supply voltage references, the DC/DC converter also including a current sensor connected to the first drive transistor in said pair, a current reading circuit connected to said sensor, and a controller connected to an output of the current reading circuit and structured to control the drive transistors of the module, said reading circuit including a transconductance amplifier connected across said current sensor to sense a voltage signal related to a load current being applied to each of said modules, said transconductance amplifier reading said voltage signal with said first drive transistor during a transition to a conducting state, the controller being structured to detect from the voltage signal whether the load current exceeds a current threshold, and if the sensed current exceeds the current threshold, then keep the first drive transistor in the conducting state until the sensed current falls back to the current threshold.

2. A controller device according to claim 1, wherein said transconductance amplifier is a track-and-hold type structured to interrupt reading said voltage signal during periods of instability in the working conditions of said DC/DC converter.

3. A controller device according to claim 1, wherein said transconductance amplifier generates an update signal (track) by combining a control signal of said one transistor and a clock signal to each module together through an AND logic operator.

4. A controller device according to claim 1, further comprising an error amplifier having an input terminal connected to said second supply voltage reference, and having an output terminal feedback-connected to another input terminal through a bias resistive element, said error amplifier outputting a triangular PWM signal.

5. A controller device according to claim 4, further comprising a plurality of PWM modulators connected to said output terminal of said error amplifier.

6. A controller device according to claim 5, further comprising a comparator structured to compare the reading by said reading circuit with a reference signal, thereby allowing the current to be checked at each reading cycle.

7. A controller device according to claim 4, wherein a sum of DC values of current readings by said reading circuit each is used for shifting a reference signal of a loop, containing said error amplifier, proportionally to an applied load to each module.

8. A controller device according to claim 4, wherein said DC/DC converter compares current information in each module with a mean value of the currents, thereby correcting a read control voltage of each module and any unbalance between modules, and equalizing the output current values.

9. A controller device according to claim 1, wherein said reading circuit has an output connected to a summing node, said summing node being also input an output voltage Vo(f) from each module and outputting a first order estimate of the load current of said DC/DC converter.

10. A controller device according to claim 9, wherein said summing node is connected to another summing node arranged to be input a reference signal, and that said another summing node is connected to said DC/DC converter through a series of an error amplifier and a PWM modulator.

11. A controller device according to claim 10, wherein said DC/DC converter processes the reading performed by said reading circuit to obtain an error amplifier output voltage in the frequency domain given as:

$$vc(f)=Zf/Zi*vo(f)-Zf*k*\Sigma i\ Rsense*li(f)$$

where:
vs(f) is a control voltage of said PWM modulator,
vo(f) is an output voltage of each module,
Zf is an output-to-inverting terminal impedance of said error amplifier,
Zi is an inverting terminal-to-output voltage impedance of said error amplifier, and
li(f) is a current sampling of said module.

12. A controller device according to claim 10, further comprising an additional compensation network connected between an output terminal of said DC/DC converter and an inverting terminal of said error amplifier to provide a stable DC/DC converter.

13. A voltage/current controller device, comprising:
a first drive transistor connected between a first supply voltage reference and an intermediate circuit node connected to a load;
a second drive transistor connected between the intermediate circuit node and a second supply voltage reference;
a track-and-hold transconductance amplifier connected to a selected one of the first and second drive transistors, the transconductance amplifier being structured to sense a current though the selected drive transistor during a conducting state of the selected drive transistor; and
a controller coupled to an output of the transconductance amplifier, the controller being structured to keep the selected drive transistor in the conducting state in response to detecting that the sensed current has exceeded a current threshold, and drive the first and second drive transistors with pulse width modulated signal in response to the sensed current falling below the current threshold.

14. The controller device of claim 13, further comprising an error amplifier having a first input terminal connected to said second supply voltage reference and an output terminal connected to an output of the transconductance amplifier through a bias resistive element.

15. The controller device of claim 14 wherein the error amplifier includes a second input terminal feedback-connected to the output terminal by the bias resistive element.

16. The controller device of claim 14, wherein the controller includes a PWM modulator having an input connected to the output terminal of the error amplifier and an output connected to a DC/DC converter that includes the first and second drive transistors.

17. The controller device of claim 13, wherein the first and second drive transistors comprise a first DC/DC converter module, the controller device further comprising:

a second DC/DC converter module; and a summing node having a first input connected to an output of the transconductive amplifier, a second input connected to receive an output voltage Vo(f) from each module, and an output that provides a first order estimate of a load current of the first DC/DC converter module.

18. A method of controlling a current imparted to a load using a controller device that includes first and second drive transistors connected between a first and second supply voltage references, the first and second drive transistors being connected to each other at an intermediate circuit node connected to the load, the method comprising:

sensing a current through the first drive transistor during a transition to a conducting state of the first drive transistor;

detecting whether the sensed current exceeds a current threshold;

if the sensed current exceeds the current threshold, then keeping the first drive transistor in the conducting state until the sensed current falls back to the current threshold; and turning on the second drive transistor in response to detecting that the sensed current has fallen back to the current threshold.

19. The method of claim 18, further comprising:

sensing the current through the first drive transistor during the conducting state of the first drive transistor:

stopping the sensing of the current prior to a conducting state of the second drive transistor;

holding a value of the sensed current during the conducting state of the second drive transistor; and adjusting duty cycles of the first and second drive transistors based on the held value of the sensed current.

* * * * *